United States Patent [19]

Kumamaru et al.

[11] 4,097,119
[45] Jun. 27, 1978

[54] OPTICAL FIBER CABLE

[75] Inventors: Hiroyuki Kumamaru; Hiromu Shioyama; Masao Hoshikawa, all of Yokohama, Japan

[73] Assignee: Sumitomo Electric Industries, Ltd., Osaka, Japan

[21] Appl. No.: 584,663

[22] Filed: Jun. 6, 1975

[30] Foreign Application Priority Data

Jun. 7, 1974 Japan .................................. 49-65202

[51] Int. Cl.² .............................................. G02B 5/16
[52] U.S. Cl. .................................................. 350/96.23
[58] Field of Search ............... 350/96 B, 96 R, 96 BC

[56] References Cited

U.S. PATENT DOCUMENTS

| 3,699,950 | 10/1972 | Humphrey, Jr. et al. | 350/96 C |
| 3,740,116 | 6/1973 | Andrews, Jr. | 350/96 B |
| 3,766,307 | 10/1973 | Andrews, Jr. | 350/96 B X |
| 3,865,466 | 2/1975 | Slaughter | 350/96 B |
| 3,883,218 | 5/1975 | Slaughter | 350/96 B |
| 3,887,265 | 6/1975 | Margolis et al. | 350/96 B |
| 3,937,559 | 2/1976 | Ferrentino et al. | 350/96 B |

FOREIGN PATENT DOCUMENTS 2,430,857   1/1975   Germany .................. 350/96 B Primary Examiner—John K. Corbin
Assistant Examiner—Stewart Levy
Attorney, Agent, or Firm—Sughrue, Rothwell, Mion, Zinn and Macpeak

[57] ABSTRACT

An optical fiber cable of a structure comprising optical fibers, cushion layers supporting the fibers by way of low friction layers and a strengthening member provided lengthwise along the cable, wherein concentrated tension and compression applied to the optical fibers due to the external bending force can be dispersed through the cushion and low friction layers and the tension applied to the entire cable can be received by the strengthening member.

13 Claims, 4 Drawing Figures

_4,097,119_

OPTICAL FIBER CABLE

BACKGROUND OF THE INVENTION

1. Field of the Invention

The present invention relates to a structure of an optical fiber cable having fiber bundles each comprising a plurality of optical fibers.

2. Description of the Prior Art

As is well-known, one development generally made so far, for various optical fibers comprises a core made of highly fused silica doped with titanium oxides and a cladding layer of highly pure silica which can transmit the optical singnals at lower loss. However, these optical fibers are still unsatisfactory for preparing cables for use with practical optical transmission in view of their flexibility, elongation, breaking strength and the like, and the optical fibers that can suitably be used for the practical application have not yet been developed.

SUMMARY OF THE INVENTION

An object of the present invention is to provide a structure of an optical fiber cable comprising a plurality of optical fibers having excellent flexibility, elongation and breaking strength for practical use and capable of dissolving the foregoing technical problems.

Another object of the present invention is to provide an optical fiber cable comprising a structure wherein, in installing or transporting the optical fiber cable, the tensile force applied to the cable is received by a strengthening member and the local compression and the tensile force exerted to the optical fibers disposed in the cable due to the bending of the cable is absorbed in cushion layers.

DESCRIPTION OF THE ACCOMPANYING DRAWINGS

FIGS. 1, 2, 3 and 4 represent respectively cross sections of different embodiments of optical fiber cables according to the present invention.

DESCRIPTION OF THE PREFERRED EMBODIMENTS

Figure 1:
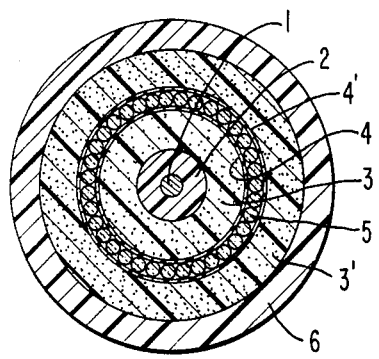

The present invention is to be described by way of a typical preferred embodiment thereof illustrated in FIG. 1, wherein there are shown a strengthening member 1 made of steel wire or high tensile plastic strand, a plastic layer 2 which covers said strengthening member 1, an inner cushion layer 3 provided on said plastic layer 2 and usually made of non-woven plastic fabric or foamed plastic layer, a low friction thin layer 4 provided on said cushion layer 3, another low friction thin layer 4' provided between an outer cushion layer 3' and optical fibers 5. The optical fibers 5 are generally made of highly pure silicon fiber of about 200 $\mu$ in diameter. Finally, a reinforcing layer 6 made of plastic, metal, or composite material consisting of plastic and metal is applied to make a cable of about 500 $\mu$ in diameter. The optical fibers 5 may be a single fiber strand or a bundle composed of several optical fiber strands.

The cushion layer 3' is provided for preventing the stress caused by the bending of the cable from concentrating within the optical fiber, and the outer sheath layer 6 is usually composed of a composite material comprising a metal sheath and plastic.

As low friction material for the layers 4 and 4', those tapes such as made of polyethylene, polyesters, FEP, TEF and the like having slippery surfaces are used.

The optical fiber cable such as shown in FIG. 1 is subjected to bending and tensile force when they are installed or transported. This applies tension and bending force to the optical fibers disposed in the optical fiber cable in two different manners, that is, lengthwise tension along the cable when the entire cable is pulled along its length and local compression and tension when the cable is bent or twisted. The optical fibers are often broken due to such local stress. In order to moderate such tensile stess or concentrated bending stress, cushion layers 3 and 3' are provided putting the optical fiber layer therebetween and, in addition, low frictional layers are provided between said optical fibers and these cushion layers in the fiber cable of the present invention. With such construction. the optical fibers can side between these layers in the direction of reducing the tension applied to said optical fiber layer thereby dispersing the local bending stress otherwise concentrated to said optical fiber.

In this embodiment a further string-shaped strand cushion members such as strings of roving jute, rolled thin plastic string or the like may be inserted between adjacent optical fibers or units 5 composed of a plurality of optical fibers bundled together in order to obtain more preferred buffering effect.

It has been experimentally confirmed that while the elongation of the optical fiber should be about 0.5% for obtaining optical fiber cables having 1% elongation at break in the usual cable structure without such cushion layers, the apparent elongation of the optical fiber cable according to this invention can be increased as high as 5% where the cushion layers and the low friction layers are provided.

Figure 2:
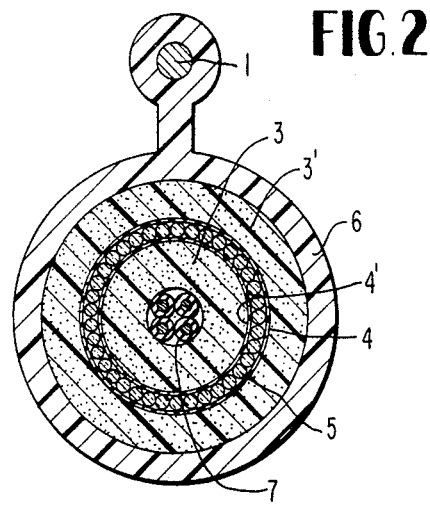
Figure 3:
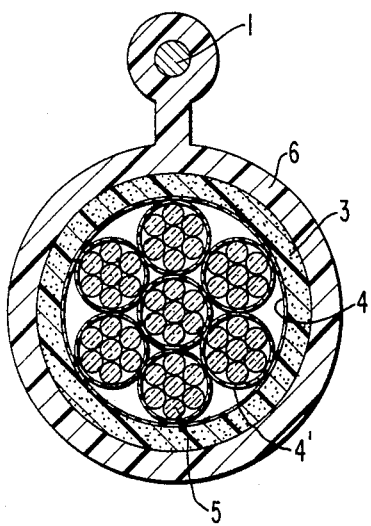
Figure 4:
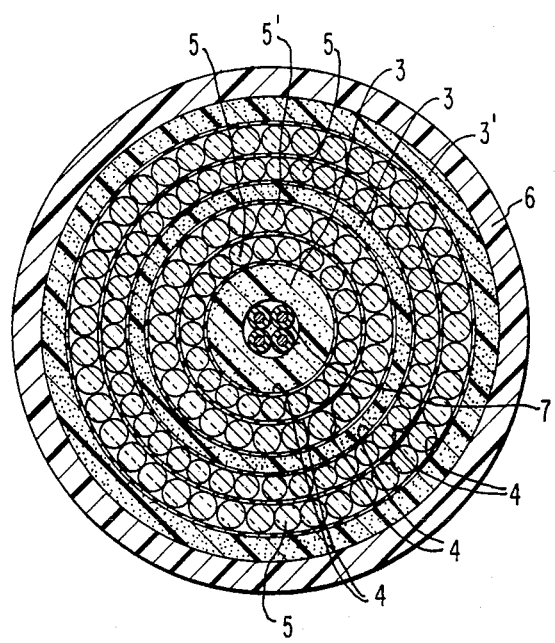

Other embodiments of the present invention are shown in their cross sections in FIGS. 2, 3 and 4. In FIG. 2, the same reference numerals as in the FIG. 1 represent corresponding components respectively, and the numeral 7 denotes power lines or other communication lines which can run in parallel with the optical fiber cable.

In the optical fiber cable shown in FIG. 3, a plurality of optical fibers are bundled into seven units each being covered with a low friction layers 4'. The units are surrounded with a cushion layers by way of a low friction layer 4 and further provided thereover with a protection sheath layer 6. The optical fiber cable shown in FIG. 3 is provided lengthwise with a strengthening member 1 also as in the cable in FIG. 2.

The optical fiber cable illustrated in FIG. 4 is a composite type optical fiber cable comprising a power lines or other communication lines in the cable center and a plurality of optical fiber layers, low friction layers and cushion layers on the outer circumference of said lines.

The optical fiber cable of the present invention as shown in the FIG. 1 undergoes, in laying or handling, two kinds of tensile force, one being the tensile force applied on the entire optical fibers when the cable is pulled and the other being concentrated compression and tensile force applied to the optical fibers disposed in the cable on the opposing sides of the neutral layer of the fibers when the cable is bent or twisted.

The elongation of optical fibers is extremely low as compared with that of copper or steel wires and it is considered less than 0.5%. Accordingly, when the cable is pulled or bent in laying operation, optical fibers in an optical fiber cable are easily broken by the local stress caused by such tension and bending.

Therefore, the strengthening member in the optical fiber cable having the structure as shown in FIG. 1 is required to have a sufficient cross section to receive and withstand almost all of the tension force exerted to the cable. The local stress generated in the cable due to the tension and bending during installing can be remarkably moderated by the slipping of low friction layers 4 and 4' adjacent to the optical fibers and by buffering action of the cushion layers 3 and 3'.

An optical fiber cable of about 20 mm outer diameter and 250 m length having the structure as shown in FIG. 1 shows no breaks within its optical fibers when it is installed under a tension of 50 kg. Also, when it is wound around a rod of 80 mm radius and subjected to repeated flexure for about ten times, the optical fibers again show no breaks.

According to the optical fiber cable of the present invention, the local tension and compression exerting on the optical fibers caused by the pulling and bending forces which are applied to the entire cable at the time of installing can be moderated by the provision of cushion layers to the optical fiber layer by way of low friction layers disposed in adjacent to said fibers layer. Moreover, by providing a strengthening member lengthwise along the optical fiber cable, almost of the tension applied to the cable is received thereby to prevent said tension from being exerted on the optical fibers in installing the cable. Thus, an excellent optical fiber cable in which optical fibers are highly resistant to break can be obtained according to this invention.

What is claimed is:

1. An optical fiber cable comprising:
 a plurality of bundles of optical fibers,
 a strengthening member extending lengthwise along the cable,
 low friction thin, polymeric tape slipping layers on respective sides of said bundles of optical fibers to permit slipping movement between said optical fibers and said low friction layers to prevent breakage of said optical fibers under applied stress to said cable,
 cushion layers disposed on the side of the low friction layers remote from said bundles of optical fibers, and
 protection layers underlying the radially innermost cushion layer and overlying the radially outermost cushion layer.

2. An optical fiber cable as defined in claim 1, further comprising insulated conductors for signal or power transmission.

3. An optical fiber cable comprising: at least one layer of optical fibers, a strengthening member extending lengthwise along the cable, low friction thin, polymeric tape slipping layers provided on both sides of said at least one layer of optical fibers to permit slipping movement between said optical fibers and said low friction layers to prevent breakage of said optical fibers under applied stress to said cable, cushion layers disposed on the side of the low friction layers remote from said optical fibers and at least an outer protection layer surrounding the radially outermost cushion layer.

4. An optical fiber cable as defined in claim 3, wherein the strengthening member is of steel wire.

5. An optical fiber cable as defined in claim 3, wherein the strengthening member is of plastic.

6. An optical fiber cable as defined in claim 3, wherein the strengthening member is of reinforced plastic.

7. An optical fiber cable as defined in claim 3, wherein the strengthening member is of carbon fiber.

8. An optical fiber cable as defined in claim 3, wherein the strengthening member is of glass fiber.

9. An optical fiber cable as defined in claim 3, wherein said cushion layers consists of non-woven plastic fiber.

10. An optical fiber cable as defined in claim 3, wherein said cushion layers consist of foamed plastic.

11. An optical fiber cable as defined in claim 3, wherein said cushion layers consist of non-woven glass fiber.

12. An optical fiber cable as defined in claim 7, wherein said low friction layers comprise one member of the group consisting of polyethylene, polyester, FEP tape and TEF tape.

13. An optical fiber cable as defined in claim 3, further comprising insulated conductors for signal or power transmission.

* * * * *